June 15, 1965    M. A. DAVIS    3,189,812
MOTOR CONTROL APPARATUS FOR CUTTING TRAVELING WORKPIECE
Filed March 30, 1961    2 Sheets-Sheet 1

WITNESSES
John E. Hensley, Jr.
James F. Young

INVENTORS
Marvin A. Davis &
George Kemp
BY T.W. Brodahl
ATTORNEY

United States Patent Office 3,189,812
Patented June 15, 1965

3,189,812
MOTOR CONTROL APPARATUS FOR CUTTING TRAVELING WORKPIECE
Marvin A. Davis, Clarence, and George Kemp, Depew, N.Y., assignors to Westinghouse Electric Corporation, East Pittsburgh, Pa., a corporation of Pennsylvania
Filed Mar. 30, 1961, Ser. No. 99,423
6 Claims. (Cl. 318—445)

The present invention in general relates to control apparatus, and more particularly to control apparatus operative with the motor of a workpiece cutting device such as a shear for cutting the moving strip workpiece resulting from the operation of a strip steel rolling mill.

In the operation of a hot steel strip rolling mill, it is sometimes desired to cut off from the rolled strip a preset length of the front end of the strip and another preset length of the tail end of the strip. The reason for this is that these end portions of a rolled strip in particular are likely to be out of allowable thickness tolerances. A crop shear device is provided to shear off these "off-gauge" end portions of the rolled steel strip. When the strip of steel is traveling at speeds of several hundred feet per minute, it is difficult and sometimes wasteful to manually control this shearing operation.

It is an object of the present invention to provide improved control apparatus operative with a moving workpiece cutting device or the like whereby an operational accuracy in the order of an inch of length is obtainable at workpiece travel speeds in the order of several hundred feet per minute.

It is another object of the present invention to provide improved control apparatus operative with a moving workpiece cutting device, which control apparatus is more reliable in operation, is less expensive to maintain and repair and more accurately measures the workpiece relative to at least one desired cut to be made for controlling the operation of the cutting device relative to each of the one or more desired cuts to be made.

It is a further object of the present invention to provide improved motor control apparatus for a workpiece cutting device that more accurately determines the necessary motor operation delay period relative to each desired cut to be made in accordance with known previous such operations.

It is a different object of the present invention to provide improved motor control apparatus for a workpiece cutting device which is better and more accurately operative to effect one or more predetermined desired cuts in a moving workpiece.

These and other objects and advantages of the present invention will become apparent in view of the following description taken in conjunction with the drawings, wherein.

In accordance with the teachings of the present invention, a motor control system is provided which measures the velocity of an inwardly moving strip of hot steel and computes and generates the necessary time delay so that a preset length of steel is cut from the front end of the steel strip and if desired another preset length is cut from the tail end of the steel strip. The cut lengths may be varied as desired. The velocity of the movement of the steel strip along a predetermined work path relative to the strip cutting device may be anywhere within a wide range as long as it remains substantially constant throughout the particular cutting operation.

Figure 1:
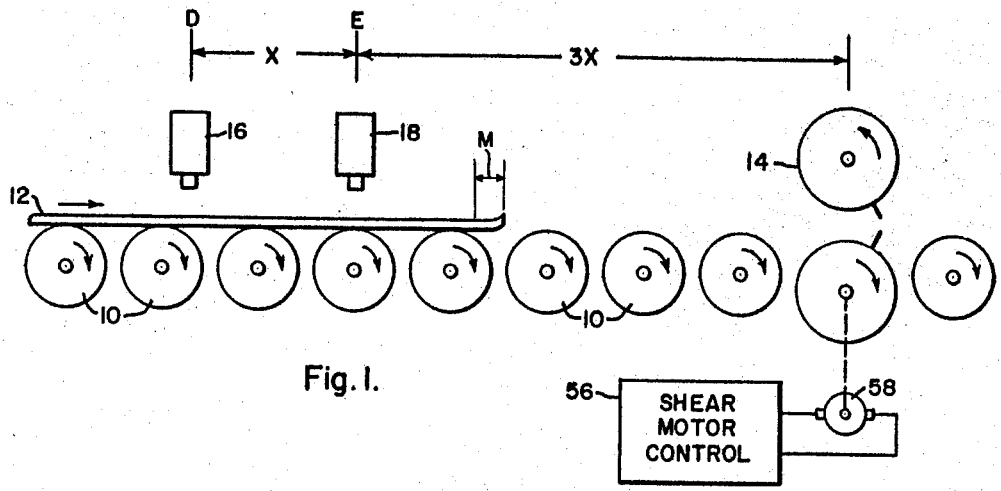
FIGURE 1 is a diagrammatic showing of a workpiece moving along a roller table toward a workpiece cutting device.

In FIGURE 1, there are shown multiple workpiece support rollers 10 operative to move a workpiece strip 12 in the direction indicated by the arrow toward a workpiece cutting device 14. A first position sensing device, such as the hot metal detector 16, initially senses the leading edge of the workpiece strip 12. A second position sensing device, such as the second hot metal detector 18, is located a predetermined distance away from the first position sensing device 16 and senses the leading edge of the workpiece strip 12 after it has moved the distance between the workpiece position sensing devices 16 and 18. The cut position of the workpiece cutting device 14 occurs in the workpiece travel path of the workpiece strip 12 and is located a predetermined distance away from the second workpiece position sensing device 18 in the direction of movement of the workpiece 12, which distance is related to the spacing between the workpiece sensing members 16 and 18. More specifically, if the space between the workpiece sensing detectors 16 and 18 is X, the distance between the cutting position of the workpiece cutting device 14 and the second workpiece sensing detector 18 may be a predetermined multiple of X, for example 3X.

Figure 2:
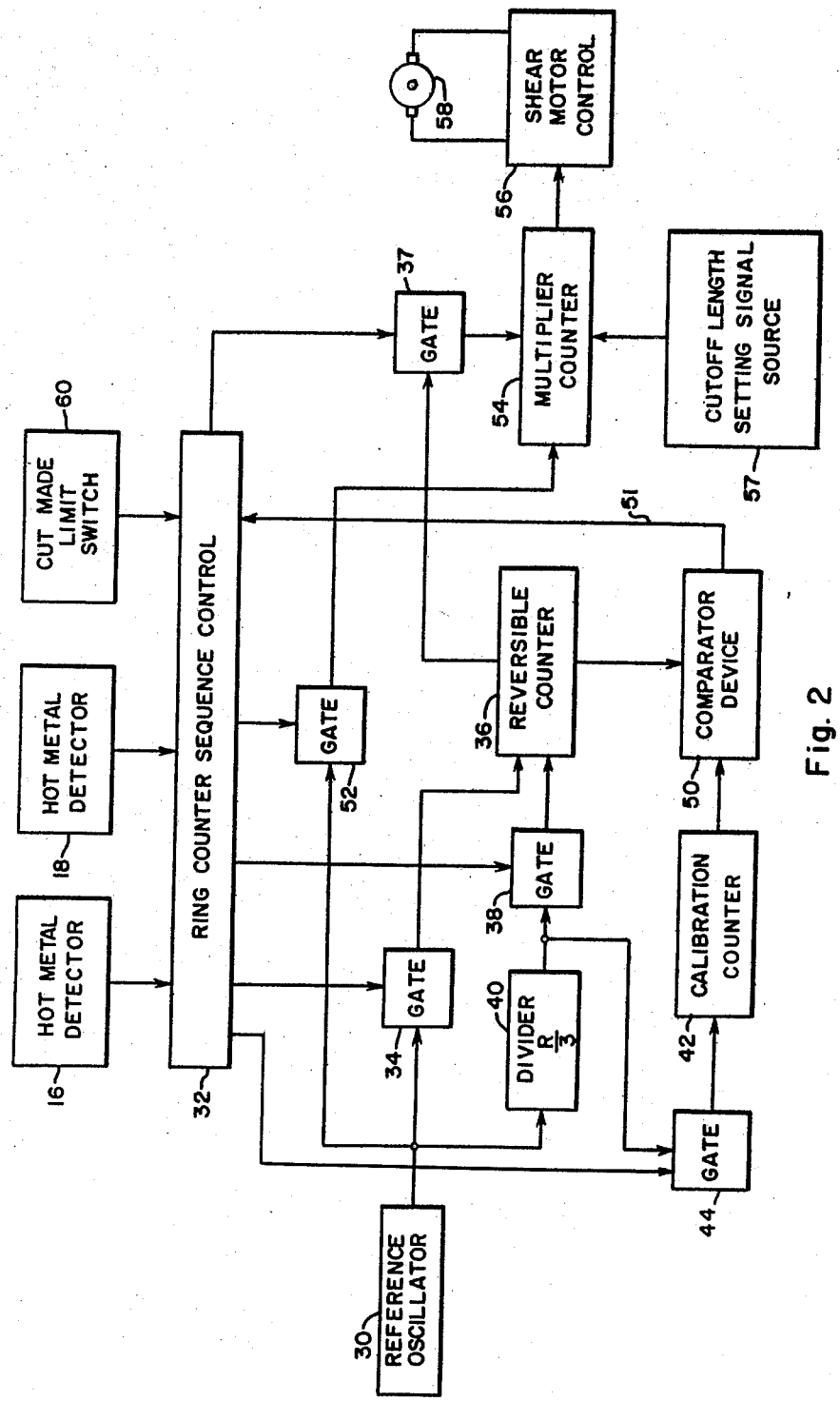
FIG. 2 is a curve chart illustrating the operation of the present motor control apparatus.

In FIGURE 2, there is shown a diagrammatic illustration of the motor control apparatus in accordance with the teachings of the present invention. A reference oscillator 30 is operative to provide signal pulses at a predetermined reference rate or number per minute. The first workpiece position sensing detector 16, which is a hot metal detector, is operative with a well known ring counter sequence control 32 for providing a control signal to open the signal gate 34 when the end of the workpiece 12 reaches a position corresponding to the location of the first workpiece position sensing detector 16. The signal pulses from the reference oscillator 30 are then supplied through the now open signal gate 34 to the UP input of a reversible counter 36 for counting in an upward direction as shown by curve 3A of FIGURE 3 to the upper count $N_1$ at a slope R between the time D and time E as shown by curve 3A in FIGURE 3.

Figure 3:
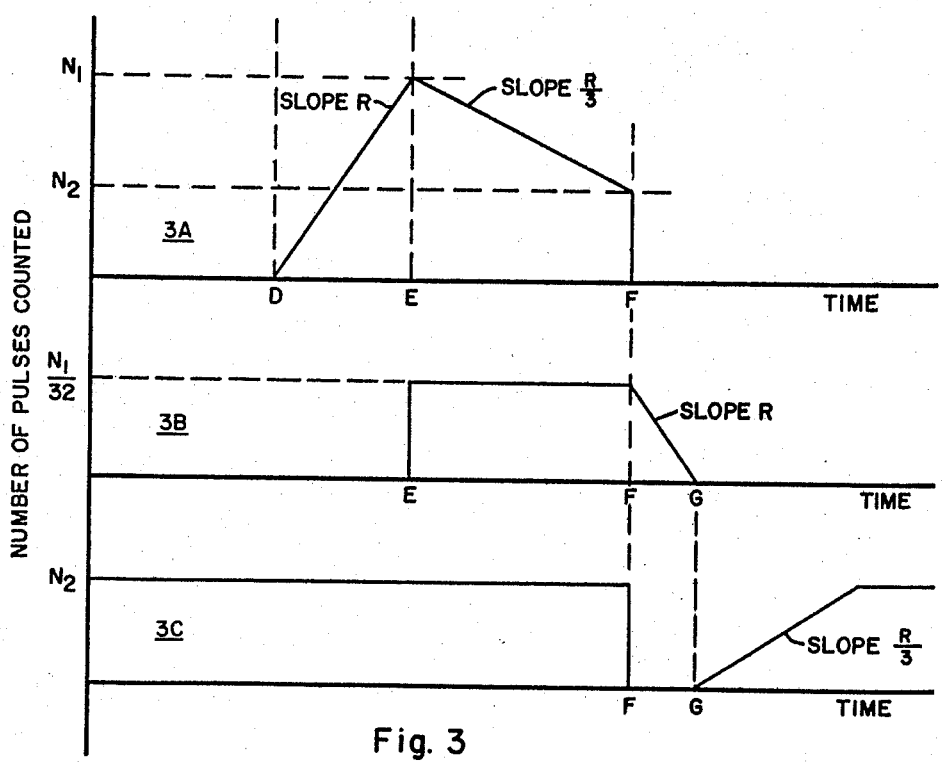
FIG. 3 is a diagrammatic showing of the motor control apparatus in accordance with the teachings of the present invention.

When the leading end of the workpiece 12 reaches a position corresponding to the location of the second workpiece position sensing device 18, which again is a hot metal detector, the ring counter sequence control 32 is operative to open the signal gate 38 and close the signal gate 34 such that the reversible counter 36 now begins counting in the reverse or downward direction the signal pulses from the reference oscillator 30 as supplied through a frequency divider 40 which effectively divides by the ratio of the distances X to 3X or by one-third, such that the reversible counter receives signal pulses through the now open signal gate 38 at a rate one-third of the supply frequency of the signal pulses from the reference oscillator 30 and thereby the reversible counter 36 begins counting in a downward direction as illustrated in curve 3A of FIGURE 3 between the time E and the time F.

The calibration counter 42 is initially supplied, by opening the signal gate 44, with a number corresponding to the number of oscillator pulses at the frequency rate $R/3$ that occur during the time period that the workpiece cutting device 14 requires to operate. This number of pulses is obtained by initially operating the shear 14 for calibration purposes only and with no steel being cut. If desired the gate 44 can be opened by a manually controlled signal providing switch for this purpose. A comparator device 50 is operative to sense the stored count level number of the calibration counter 42 and compare the latter to the count level of the reversible counter 36 such that when the count level of the reversible counter 36 corresponds substantially to the count level of the calibration counter 42, the comparator device 50 provides an output control signal to the ring counter sequence control 32 through the conductor 51 for opening the signal gate 52 and closing the signal gate 38. Signal pulses from the reference oscillator 30 are now supplied through the open signal gate 52 to the multiplier counter 54.

It should be noted that a manual operated cutoff length setting signal source 57 is operative initially to provide the multiplier counter 54 with a predetermined count level M corresponding to the desired length of M material to be removed from the workpiece 12. Thusly when the signal gate 52 is opened, the multiplier counter 54 begins counting in a downward direction from the latter count level M at a slope R corresponding to the frequency of the signal pulses from the reference oscillator 30 and as illustrated by curve 3B between the time F and the time G as shown in FIGURE 3. When the multiplier counter 54 reaches a zero count level, the shear motor control 56 is energized and causes the motor 58 operative with the workpiece shear or cutting device 14 to effect the desired cut in the workpiece 12.

Relative to the curve chart as shown in FIGURE 3, the curve 3A illustrates the counting operation of the provided reversible counter 36 to be later described relative to FIG. 3. More specifically, starting at a time corresponding to the operation of the first workpiece sensing detector or member 16, the reversible counter begins to count in a first direction for example an upward direction at a rate in accordance with the slope R and corresponding to the reference frequency of the signal pulses from a reference oscillator. At a time E corresponding to the energization of the second workpiece position sensing member 18, the reversible counter reverses its operation and then begins to count in a downward direction at a different rate and in accordance with the slope R divided by 3 corresponding to a rate one-third the frequency of the signal pulses from the reference oscillator.

The curve 3B illustrates the operation of the provided multiplier counter 54 to be described relative to FIGURE 3. The multiplier counter is operative such that at a time E it receives a predetermined count M corresponding to the product of the count in the reversible counter at time E, divided by the distance X, and a manual setting of the desired length of the front end or the tail end of the strip to be removed from the body of the strip. At the time F due to the operation of a provided comparator device 50, the multiplier counter begins to count in a downward direction the signal pulses from the reference oscillator 30 such that at a time G the count level reaches zero and causes the shear motor to operate the workpiece shear or cutting device.

The curve 3C illustrates the operation of a provided calibration counter or register to be described in greater detail relative to FIGURE 3, which calibration counter 42 is initially provided with a calibration count of $N_2$ pulses corresponding to a predetermined number of signal pulses in accordance with the known inertia or time delay operation of the workpiece cutting device 14. At the time F, the count of the calibration counter 42 is compared with and corresponds to the count of the reversible counter 36 and starts the downward count operation of the multiplier counter 54.

Since a predetermined and known distance X is provided between the first workpiece position sensing device 16 and the second workpiece position sensing device 18, there is provided means for determining the movement speed of the workpiece 12 along the work path defined by the work rollers 10. The reference oscillator 30 supplies signal pulses at a constant and known frequency and thusly a direct measure of the movement speed of the workpiece 12 is provided by the counting operation of the reversible counter 36 counting in an upward direction between the time D and the time E as shown in curve 3A of FIGURE 3. It should be further noted that when the end of the workpiece 12 reaches the hot metal detector 16, the reversible counter 36 started counting in an upward direction at a constant rate R as shown in curve 3A of FIGURE 3. The signal pulses counted by the reversible counter 36 were at a substantially constant frequency from the reference oscillator 30. When the leading edge of the workpiece 12 reached the second hot metal detector 18, the reversible counter 36 is caused to reverse its counting direction and begin counting in a downward direction at a constant rate equal to the ratio between the respective distances X and 3X or at a rate one-third of the upper direction counting rate. This is also shown by the curve 3A of FIGURE 3 between the time E and the time F. Since the ratio of the distance between the hot metal detectors 16 and 18 as compared to the distance between the hot metal detector 18 and the workpiece cutting device 14 is 1 to 3, the count level of the reversible counter in the downward direction would reach zero when the leading edge of the workpiece 12 reached the workpiece cutting device 14.

However, to take into account the inherent time delay of the mechanical operation of the workpiece cutting device 14, the counting operation of the reversible counter 36 in the downward direction is stopped at a time F and at a count level $N_2$ greater than zero. The count level $N_2$ of the reversible counter 36 at the time F is predetermined from a knowledge of the known past history time delay of the workpiece cutting device 14, between an initial operation signal and the time that it finally effects the cut in the workpiece. The workpiece cutting device time delay is substantially constant and may be predetermined in advance of a particular operation of the workpiece cutting device. As a practical matter, this required time delay period may be represented in the calibration counter 42 by a digital number equivalent to the total number of signal pulses from the reference counter 30 supplied through the signal gate 38 to the reversible counter 36 at a rate R divided by 3 that would occur in this same time delay interval. Then when the count level of the reversible counter 36 is equivalent to this predetermined number of signal pulses, which is the illustrated count level $N_2$ as shown in FIGURE 3 and may be entered by the control of the gate 44 as shown in FIGURE 2, the operational function of the workpiece cutting device 14 may then be initiated.

The output signal level of the reversible counter 36 and the predetermined count level $N_2$ of the calibration counter 42 are in effect compared by the comparator device 50, as the reversible counter 36 counts down in its operation between the time E and the time F shown by the curve 3A of FIGURE 3. When the reversible counter 36 reaches the count level $N_2$ at the time F, the comparator device 50 is operative to provide the output control signal through conductor 51 to the ring counter sequence control 32.

In this regard the gate 44 is open initially to provide the time delay count level $N_2$ to the calibration counter 42 and it is this time delay count level $N_2$ from the calibration counter 42 which is compared to the stored count level in the reversible counter 36 in the comparator device 50 at the time F to provide the output control signal to the ring counter sequence control 32. Thusly, if it were desired to effect a zero length cut in the workpiece 12, the latter output control signal from the comparator device 50 to the ring counter sequence control 32 could be operative to do this if desired.

The problem now remains to generate an additional time delay such that the desired length M of material will be removed from the workpiece 12. This is accomplished by the multiplier counter 54 which is per se a well known counter device. The count level $N_1$ in the reversible counter 36 at the time it reverses, as shown at the time E in curve 3A of FIGURE 3, is proportional to the reciprocal of the velocity of the workpiece 12 along the work path. It is the number of signal pulses generated by the reference oscillator 30 at a frequency R during the time period between the time D and the time E that it takes the leading edge of the workpiece 12 to move the predetermined distance between the hot metal detector device 16 and the hot metal detector device 18. Thus for example if this distance is 32 inches, the count level in the reversible counter at the time E corresponds to $N_1 = 32 \times R$ divided by $V$, where V is the velocity of the workpiece 12 in inches per second. If we divide $N_1$ by 32, we will have the reciprocal of the velocity expressed in pulses per inch. If we multiply this by number of inches we wish to cut, we will have the desired time delay in terms of pulses of frequency R.

The computations of the previous paragraph are accomplished as follows. At the time E when the reversible counter 36 reverses, the count at the count level $N_1$ is set into the multiplier counter 54 through the signal gate 37 from the reversible counter 36 except for the five least significant bits. This is illustrated by the curve 3B of FIGURE 3. The effect of leaving off the five least significant bits is to divide the number $N_1$ by 25 or 32. The other input M to the multiplier counter 54 is manually set at the desired cut level in inches and is determined by the manual setting count level M expressed as a binary digital signal from the signal source 57 to in effect provide the count level M corresponding to the desired cut length of the workpiece 12 in inches.

When the count $N_2$ in the reversible counter 36 at the time F matches the similar count in the calibration counter 42, the comparator device 50 causes the ring counter sequence control 32 to open the signal gate 52 and thereby cause the multiplier counter 54 to count down at a rate R the signal pulses from the reference oscillator 30 by counting through $N_1$ divided by 32 pulses for each pulse value of the count level M as well known in this art until a zero count is provided in the multiplier counter 54. In this manner a time delay equal to the product of the number of the pulses per inch as represented by the count $N_1$ divided by 32 and the number of inches that it is desired to cut off the workpiece 12 as represented by the count M is provided. The control signal to start the shear is then given by the multiplier counter 54 and the correct cut is made in the workpiece 12.

The cut made limit switch 60 is employed to advance the ring counter sequence control 32 to close the gate 44.

Thusly, it will be seen in the operation of the present control apparatus that there is always maintained a count $N_2$ in the calibration counter 42 from some previous actually made cut or from a calibration run of the workpiece cutting device 14. The outputs of the reversible counter 36 and the calibration counter 42 are then compared by the comparator device 50 as the reversible counter is counting down. When the reversible counter reaches a count level $N_2$ corresponding to the stored count level in the calibration counter 42, a comparison is made and a signal is provided by the comparator device 50. If we desire to cut a zero length off the end of the workpiece 12, this latter output signal would be the signal to initiate the operation of the shear motor 58.

The count in the reversible counter 36 at the time it reverses, or in other words the count level $N_1$, is proportional to the reciprocal of the velocity. If we divide the count $N_1$ by 32, we will have the reciprocal of the velocity expressed in pulses per inch in that the hot metal detector devices 16 and 18 are positioned 32 inches apart. If we multiply this latter number by the number of inches that we wish to cut off the end of the moving workpiece 12, there is provided the desired time delay in terms of pulses of frequency R.

When the count in the reversible counter 36 matches the stored count level of the calibration counter 42, the multiplier counter 54 begins to count down to zero and generates in this manner a time delay equal to the product of the number of pulses per inch and the number of inches it is desired to cut. The signal to initiate the operation of the shear motor 58 is then given and the correct cut in the workpiece 12 is made. While the shear is in motion, the calibration counter 42 is counting so as to provide a calibration run for the next cut.

The cutting of the tail end section of the workpiece 12 is controlled in a generally similar manner as readily apparent to a person skilled in this art in view of the above teachings and description.

The various circuit elements, such as the ring counter sequence control 32, the reference oscillator 30, the frequency divider 40, the calibration counter 42, the comparator device 50, the manually operative cutoff length setting signal source switches 57, the multiplier counter 54 and the shear motor control 56, are each per se well known and conventional devices to persons skilled in this particular art.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In control apparatus for a machine device operative with a workpiece traveling along a work path, the combination of a reference pulse signal source for providing reference pulse signals, first position sensing means for providing a first control signal when said workpiece is at a first position in said work path, second position sensing means for providing a second control signal when said workpiece is at a second position in said work path, first pulse signal counting means responsive to said first and second control signals and operative to count said pulse signals for the workpiece travel time duration between the provision of said first and second control signals, second pulse signal counting means responsive to the actual operation of said machine device for counting said pulse signals and providing an output signal in accordance with the actual operational time period of said machine device, with said first pulse signal counting means being responsive to said output signal for counting said pulse signals after the provision of said second control signal until the resulting count of said first pulse counting means substantially corresponds to said output signal and then being operative to control the operation of said machine device.

2. In control apparatus for a machine device having a predetermined operational time period and being operative with a workpiece traveling along a work path, the combination of a source of reference frequency pulse signals, first position sensing means for providing a first control signal when said workpiece is at a first position in said work path, second position sensing means for providing a second control signal when said workpiece is at a second position in said work path, pulse signal counting means responsive to said first and second control signals and operative to count said pulse signals at a first rate for the time duration between the provision of said first and second control signals, machine operation sensing means responsive to a previous actual operational time period of said machine device for counting said pulse signals and providing an output signal in accordance with the latter said time period of said cutting device, with said pulse signal counting means being responsive to said output signal for counting said pulse signals at a second rate after the provision of said second control signal until the resulting count of said pulse counting means substantially corresponds to said output signal and then being operative to initiate the operation of said cutting device.

3. In control apparatus for a strip cutting device having a predetermined operational time period and being operative with a workpiece traveling along a work path, the combination of a source of reference pulse signals, first position sensing means for providing a first control signal when said workpiece is at a first position in said work path, second position sensing mean for providing a second control signal when said workpiece is at a second position in said work path, reversible pulse signal counting means responsive to said first and second control signals and operative to count in a first direction said pulse signals for the time duration between the provision of said first and second control signals, second pulse signal counting means responsive to a previous actual operational time period of said cutting device for counting said pulse signals and providing an output signal in accordance with the latter said time period of said cutting device, with said reversible pulse signal counting means being responsive to said output signal for counting said pulse signals in the opposite direction after the provision of said second control signal until the resulting count of said reversible pulse counting means substantially corresponds to said output signal and then being operative to initiate the operation of said cutting device.

4. In control apparatus for a cutting device having a predetermined operational time period and being operative with a workpiece traveling along a work path, the combination of a source of reference pulse signals, first position sensing means for providing a first control signal when said workpiece is at a first position in said work path, second position sensing means for providing a second control signal when said workpiece is at a second position in said work path, reversible pulse signal counting means responsive to said first and second control signals and operative to count said pulse signals for the time duration between the provision of said first and second control signals, second pulse signal counting means responsive to a previous actual operational time period of said cutting device for counting said pulse signals and providing an operation calibration output signal in accordance with the latter said time period of said cutting device, with said reversible pulse signal counting means being responsive to said output signal for counting said pulse signals after the provision of said second control signal until the resulting count of said reversible pulse counting means substantially corresponds to said calibration output signal and then being operative to control the operation of said cutting device.

5. In control apparatus for a machine device operative with a workpiece traveling along a work path, the combination of a source of reference pulse signals, workpiece travel speed sensing means for providing at least one control signal in accordance with the travel speed of said workpiece, first pulse signal counting means responsive to at least said one control signal and operative to count said pulse signals for a first time duration determined by the provision of at least said one control signal, second pulse signal counting means responsive to a previous actual operation of said machine device for counting said pulse signals and providing an output signal in accordance with said predetermined operation of said machine device, with said first pulse signal counting means being responsive to said output signal for counting said pulse signals for a second time duration after the provision of said one control signal and until the resulting count of said first pulse counting means substantially corresponds to said output signal and then being operative to control the operation of said machine device.

6. In control apparatus for a machine device operative with a workpiece traveling along a work path, the combination of a reference pulse signal source for providing reference pulse signals, workpiece travel speed sensing means positioned a predetermined distance along said work path from said machine device for providing at least one control signal in accordance with the travel speed of said workpiece relative to said machine device, reversible pulse signal counting means responsive to at least said one control signal and operative to count said pulse signals in one direction for a time duration determined by the provision of at least said one control signal, second pulse signal counting means responsive to a previous actual operation time delay period of said machine device for counting said pulse signals and providing an output signal in accordance with said operational time delay period of said machine device, with said reversible pulse signal counting means being responsive to said output signal for counting said pulse signals in the opposite direction after the provision of said one control signal and until the resulting count of said reversible pulse counting means substantially corresponds to said output signal and then being operative to initiate the operation of said machine device.

References Cited by the Examiner
UNITED STATES PATENTS

| | | | |
|---|---|---|---|
| 2,833,941 | 5/58 | Rosenberg | 307—149 |
| 2,907,938 | 10/59 | Hodgers et al. | 318—467 X |
| 3,082,368 | 3/63 | Rowe | 318—471 |

ORIS L. RADER, *Primary Examiner.*

MILTON O. HIRSHFIELD, *Examiner.*